C. W. ARMANTROUT.
AGRICULTURAL MACHINE FOR DIRECT ATTACHMENT TO TRACTORS.
APPLICATION FILED MAR. 7, 1921.
1,401,029.
Patented Dec. 20, 1921.
4 SHEETS—SHEET 1.
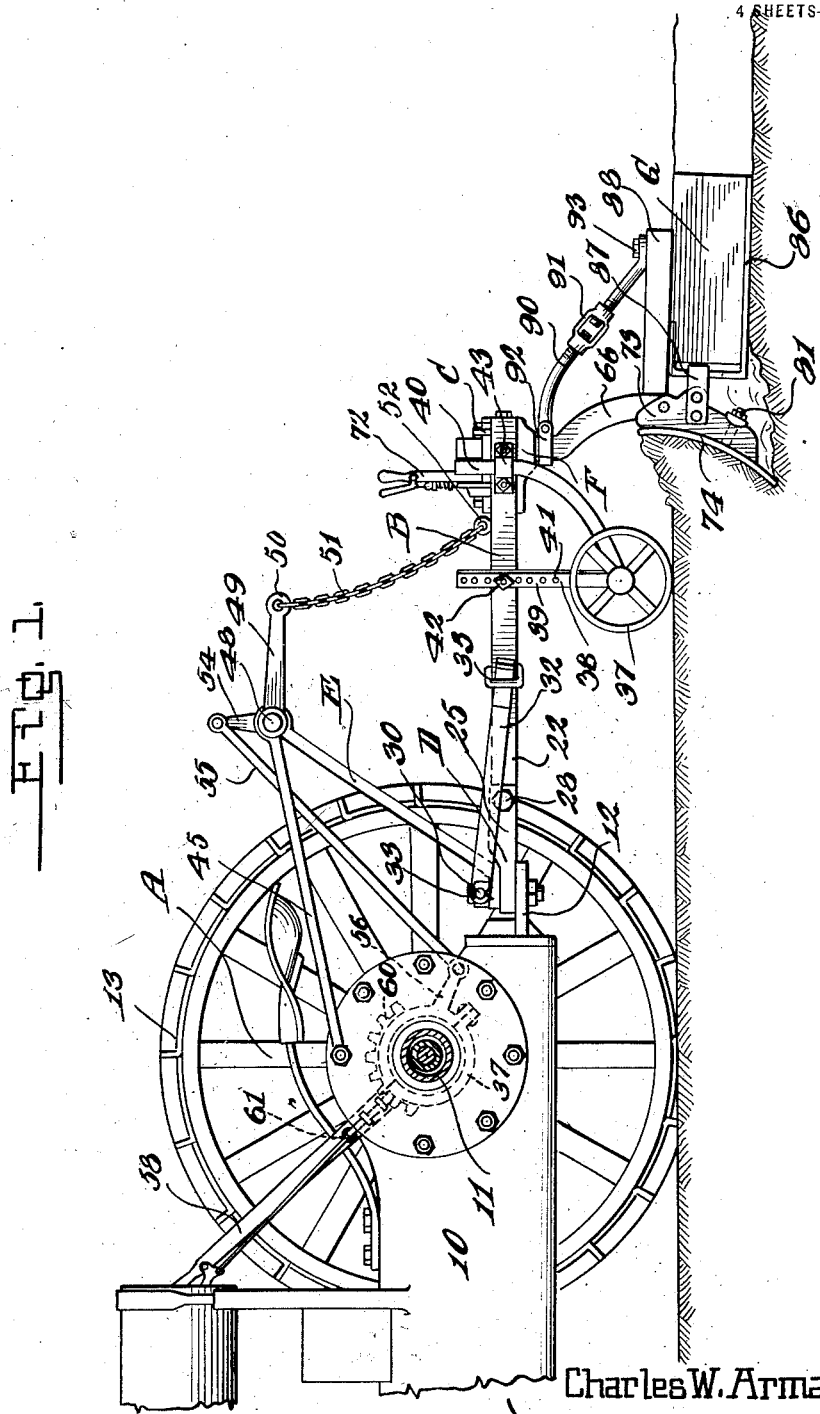
Inventor
Charles W. Armantrout
By Lancaster and Alwine
Attorney

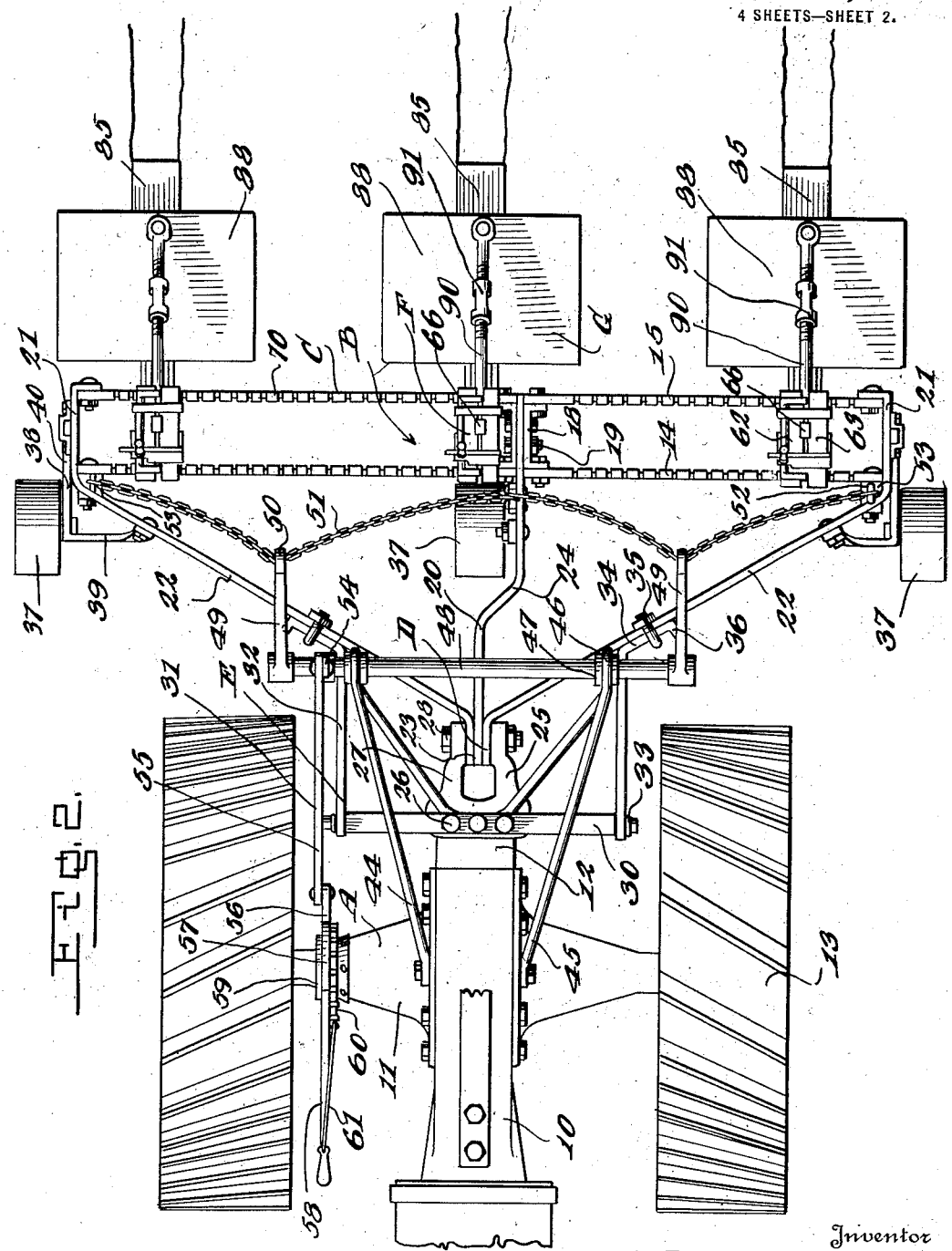

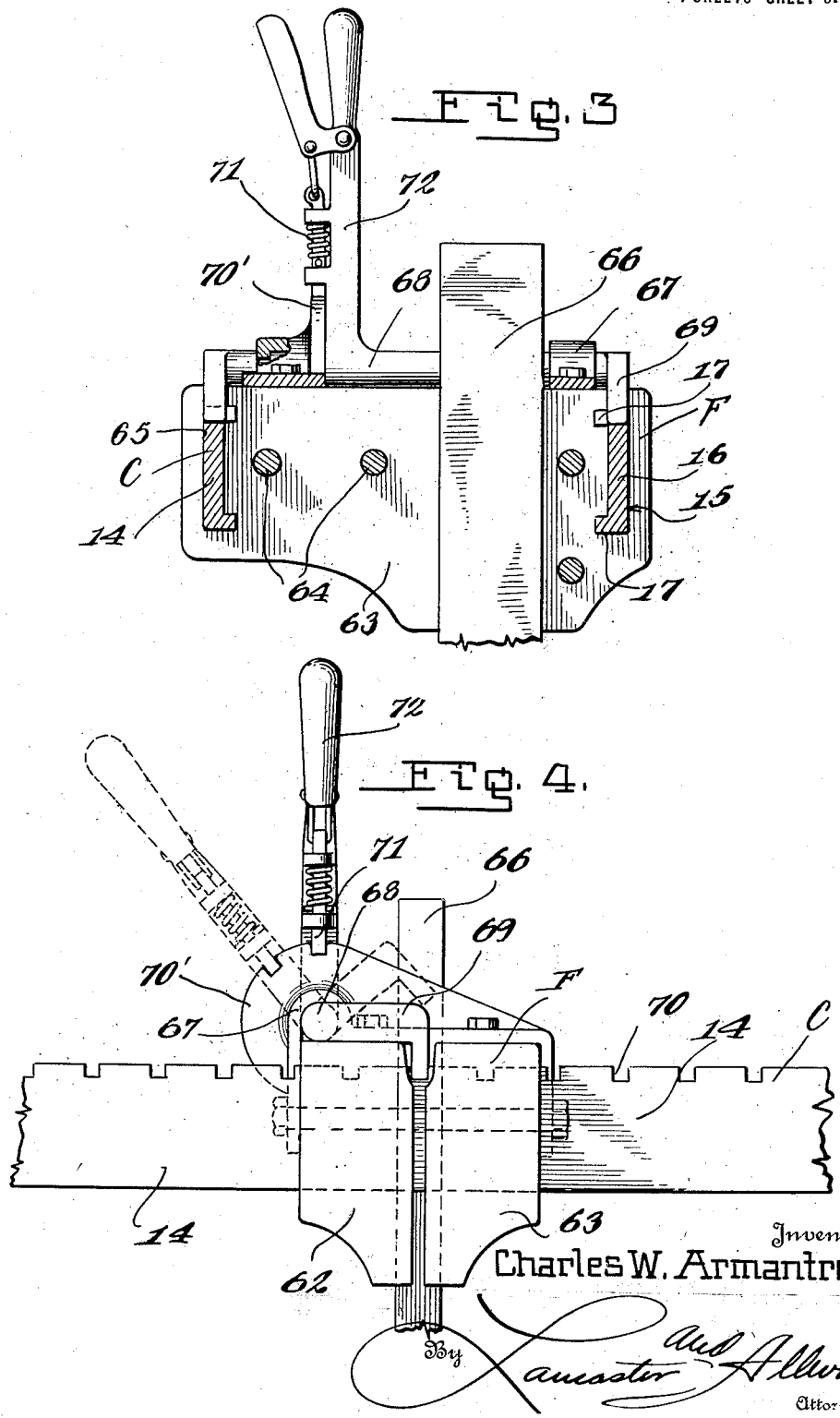

C. W. ARMANTROUT.
AGRICULTURAL MACHINE FOR DIRECT ATTACHMENT TO TRACTORS.
APPLICATION FILED MAR. 7, 1921.
1,401,029.
Patented Dec. 20, 1921.
4 SHEETS—SHEET 4.
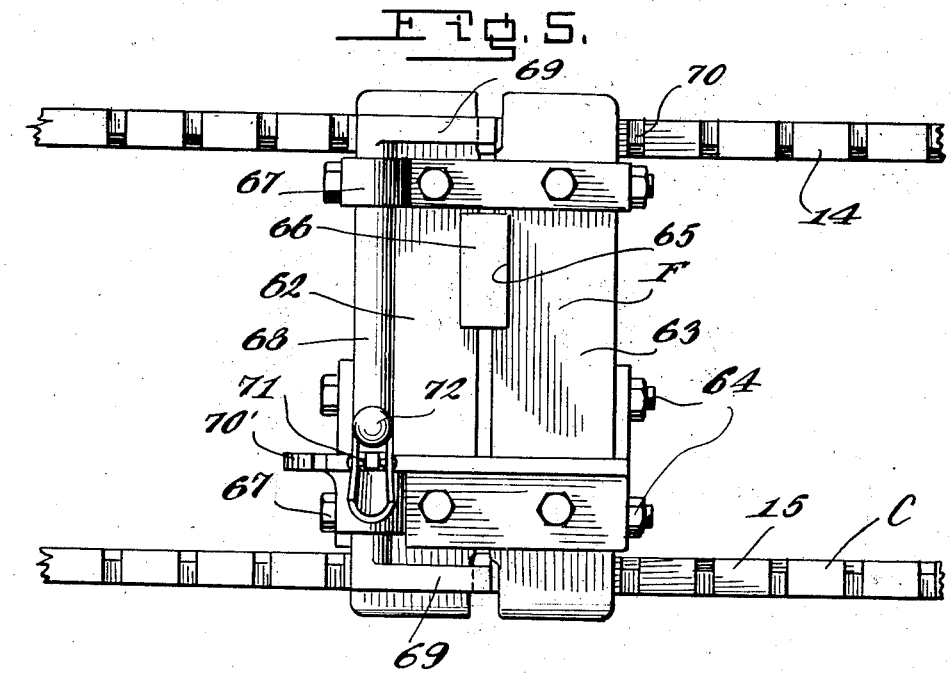
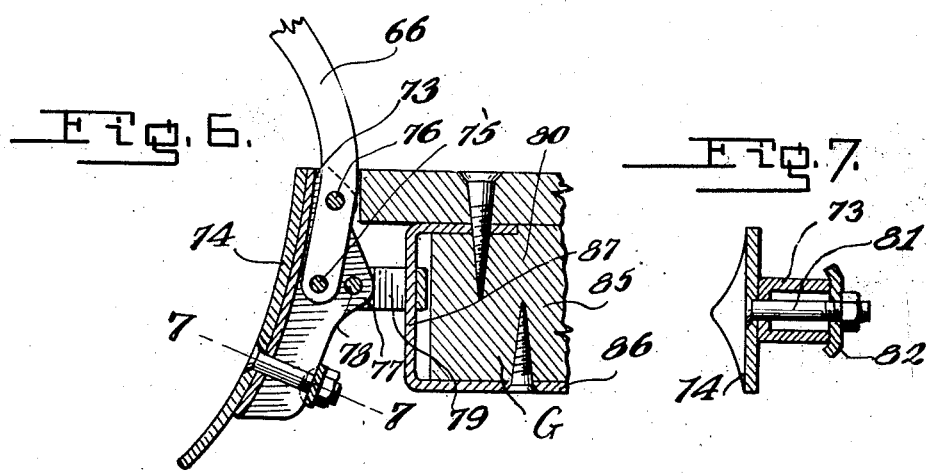
Inventor
Charles W. Armantrout
By Lancaster and Allwine
Attorneys

UNITED STATES PATENT OFFICE.

CHARLES W. ARMANTROUT, OF GRANDVIEW, WASHINGTON.

AGRICULTURAL MACHINE FOR DIRECT ATTACHMENT TO TRACTORS.

1,401,029.     Specification of Letters Patent.     Patented Dec. 20, 1921.

Application filed March 7, 1921. Serial No. 450,422.

*To all whom it may concern:*

Be it known that I, CHARLES W. ARMANTROUT, a citizen of the United States, residing at Grandview, in the county of Yakima and State of Washington, have invented certain new and useful Improvements in Agricultural Machines for Direct Attachment to Tractors, of which the following is a specification.

This invention relates to agricultural implements of the type which is adapted to be drawn by tractors, and one of the primary objects of the invention is to provide a novel type of implement for making irrigating ditches in fields, which can be effectively drawn by a tractor, and which will make a number of ditches simultaneously.

Another object of the invention is to provide a novel type of agricultural implement, which can be effectively used for either ditching, plowing, cultivating, and the like, and which embodies a novel means for permitting the adjustment of the ditching means, the plows, cultivator shovels and the like toward or away from each other, so as to permit the varying of the distance between the ditches and rows being made or cultivated, when so desired.

Another object of the invention is to provide a novel means for connecting the implement directly to the tractor, and a novel means for operating the implement from the tractor, the implement being in close arrangement with the tractor, so as to permit the short turning of the implement with the tractor thereby allowing the convenient plowing and cultivating of the corners of a field as well as the main body of the field.

Hitherto it was necessary to draw the ditching implements by hand or by teams, and it was practically impossible to make irrigating ditches through orchards already started. It is therefore a prime object of the invention to provide a novel means for connecting the implement to the tractor, so as to permit the ditching implement to be readily drawn by the tractor through orchards and the like.

A still further object of the invention is to provide an improved agricultural implement of the above character, which will be durable and efficient in use, one that will be simple and easy to manufacture, and one which can be placed upon the market and connected to an ordinary tractor at a minimum cost.

With these and other objects in view, the invention consists in the novel construction, arrangement and formation of parts, as will be hereinafter more specifically described, claimed and illustrated in the accompanying drawings, forming a part of this specification, in which:

Figure 1 is a side elevation of the improved agricultural implement showing the same connected to a tractor, the tractor being broken away and being shown partly in section.

Fig. 2 is a top plan view of the improved implement showing the same operatively connected to a tractor, the tractor being partly broken away.

Fig. 3 is an enlarged fragmentary transverse section through the body portion of the implement, illustrating the means for adjustably mounting the supporting blocks for the plows or ditching members.

Fig. 4 is a fragmentary rear elevation of the body portion of the implement, illustrating the means for adjustably securing the supporting blocks for the ditching members or plows in position.

Fig. 5 is an enlarged fragmentary plan view of the body portion of the implement, illustrating the means for adjustably connecting the supporting blocks for the ditching members or plows in position.

Fig. 6 is an enlarged fragmentary vertical sectional view through one of the ditching members illustrating the means for operatively connecting a plow share to the plow standard, and the ditch former to the plow share.

Fig. 7 is a detail sectional view through the plow share and foot taken on the line 7—7 of Fig. 6.

Referring to the drawings in detail, wherein similar reference characters designate corresponding parts throughout the several views, the letter A indicates the tractor; and B, the improved implement.

The tractor A may be of the usual or any preferred character, and has been shown to be of the Fordson type, although it is to be understood that the implement B may be connected to any preferred type of tractor. As shown the tractor A includes the frame 10 supporting the rear axle housing 11 and the draw bar 12. The rear axle housing 11 carries the usual type of drive axle, which has mounted on the terminals thereof the relatively large traction wheels 13.

The improved implement B comprises the main body portion C; the connecting means D; the adjusting means E for raising the body portion C in relation to the tractor; and the adjustable blocks F for supporting the ditching members G.

The main body portion C of the improved implement B comprises a pair of spaced parallel beams 14 and 15. These beams 14 and 15 extend transversely in relation to the tractor, and may be formed of channel construction, if so desired. As shown in the drawings, the beams 14 and 15 each include a vertically disposed body portion 16 and inwardly extending upper and lower flanges 17. These flanges 17 not only form brace or strength members for the beams, but also form bearings or supporting faces for the blocks F which will be hereinafter more fully described. These beams 14 and 15 are connected intermediate their ends by U-brace members 18. As shown, the beams 14 and 15 are formed in sections and the beams 15 have the connecting members 18 pivoted to the inner terminals of the sections thereof. These connecting means 18 are bolted together by means of suitable bolts 19, which also support the forwardly extending vertically disposed beam 20. The ends of the beams 14 and 15 have secured thereto the rearwardly extending parallel portions 21 of the side beams 22. The side beams 22 gradually converge toward their forward ends and terminate in vertically disposed attaching ears 23, between which is positioned the central beam 20. The central beam 20 is arranged at the longitudinal center, and has its rear end offset, as at 24, so as to be positioned at one side of the longitudinal center of the implement, thereby permitting the placing of the intermediate supporting block F at the central portion of the machine or implement when so desired.

The connecting means D includes a clevis 25, which may be secured by suitable bolts 26 to the ordinary draw bar 12 of the tractor A. This clevis 25 includes a pair of spaced parallel arms 27 between which are positioned the attaching ears 23 of the side beams 22 and the forward end of the central beam 20, and the beams are connected to the arms 27 by means of a suitable pivot bolt 28. This permits the swinging of the implement B in relation to the tractor A. In order to prevent undue strain on the pivot bolt 28 and to eliminate lateral movement or side sway of the implement in relation to the tractor A, a transversely extending brace bar 30 is secured to the clevis 25 at its forward end. This bar 30 is held in place by means of the bolts 26. The terminals of the bar 30 end in the cylindrical bearing fingers 31, on which are mounted for swinging movement the rearwardly extending arm 32.

Suitable fastening means 33 are provided, for preventing relative lateral movement of the arm 32 on the cross bar 30. The rearwardly extending arm 32 terminates in outwardly extending feet 34, which slidably engage the outer surface of the side beams 32. Suitable guide members 35 are carried by the side beams 32 and slidably receive the feet 34. In order to prevent displacement of the feet 34 from the guides 35, forwardly extending ears 36 are formed on the terminals of the feet. As shown the guides 35 are in the nature of U-bolts. It is essential that a limited sliding movement be permitted between the arms 32 and the beams 22 owing to the difference in the pivot points of the arms and the standards.

Suitable wheels 37 can be provided for supporting the body portion C of the implement B and these wheels are carried by suitable brackets 38. As shown these brackets include forward and rear standards 39 and 40 respectively, which may be so bent, as to conform to the configuration of the portion of the body C with which it is associated. The standard 39 is provided with a plurality of apertures 41, through any one of which is adapted to be positioned a retaining bolt 42. This retaining bolt 42 is carried by the side beam 22. The rear standard 40 is mounted in a suitable guide 43 carried by the angular portion 21 of side beams 22. By this construction, it can be seen that the wheels can be readily raised and lowered, so as to regulate the distance of the body from the ground.

The means E provided for raising and lowering the body so as to swing the plow or ditching members from above and out of engagement with the ground, comprises a pair of supporting brackets 44 and 45. These brackets 44 and 45 are arranged on the opposite sides of the body portion or frame 10 of the tractor A and are of substantially V-shaped construction in side elevation. The V-shaped brackets 44 and 45 are provided with eyes 46 which receive suitable bearing portions 47 formed on a transversely extending operating shaft 48, which will be hereinafter more fully described. The terminals of the arms of the V-shaped brackets 44 and 45 are secured respectively to the clevis 25 and to the side of the frame 10 of the tractor A. If so desired, the bolts 26 may be utilized for connecting the terminals of the lower arms of the V-shaped brackets to the clevis. The operating shaft 48 has secured in any preferred manner to its terminals crank arms 49 which have guide eyes 50 formed on the free terminals thereof. These guide eyes 50 receive the hoisting chain 51, which extends transversely across the implement. The terminals of the hoisting chain 51 are connected to suitable eye bolts 52 carried by blocks 53 which are secured in any preferred manner to the terminals of the body portion C of the implement B.

The operating shaft 48 is also provided with an intermediate crank arm 54, the outer end of which has pivotally connected thereto a connecting rod or link 55. This link is in turn pivotally connected to an arm 56, which is connected to the rotatable ring member 57, which carries the operating lever 58. This ring member 57 is mounted for rotation of the rear axle housing 11, and a suitable bearing cuff 59 is provided for rotatably supporting the ring. This cuff also supports a ratchet quadrant 60 which is adapted to be engaged by suitable dog mechanism which is carried by the operating lever 58. It can be readily seen that the operating lever 58 can easily be operated from the driver's seat of the tractor and thus the body portion can be readily raised or lowered when so desired, from the tractor. This permits the driving of the tractor with the implement attached thereto to or away from a field, without necessitating the uncoupling of the implement, and all that it is necessary to do when it is desired to start plowing or digging the ditches is to operate the lever 58 so as to lower the ground or ditching members.

A supporting block F includes the sections 62 and 63, which are adjustably connected together by means of bolts 64. These sections 62 and 63 are provided with alined openings 65, for the reception of the beams 14 and 15. The sections 62 and 63 intermediate their ends are provided with notches 65, for the reception of the standards 66 of the plows 74 of the ditching members G. The sections 62 and 63 have mounted on the upper surface thereof suitable bearings 67 for the reception of the operating shaft 68. The operating shaft 68 is provided with a pair of dogs 69, which are adapted to engage in the notches 70 formed in the upper surface of the beams 14 and 15 for holding the blocks F in any preferred adjusted position thereon. In order to prevent accidental movement of the shaft 68, one of the bearing members 67 carries a ratchet portion 70', which is adapted to be engaged by a suitable pawl mechanism 71 carried by the operating member 72 formed on the shaft 68.

As shown there are three blocks F for supporting the plows or ditching members G but it is to be understood that more or less of the blocks may be employed when desired or necessary. The lower ends of the plow standards 66 have connected thereto the feet 73, which as shown are of substantially U-shaped configuration in cross section. The feet 73 may be pivotally connected to the lower ends of the plow standards 66 by means of bolts 75. In order to prevent accidental swinging of each plow foot on the standard 66 a frangible pin 76 is provided. This pin is arranged above the bolt 75 and extends through the plow foot and standard 66. It can be seen that when a hard object such as a stone or the like is struck by the plow share point the frangible pin 76 will be broken and the plow share permitted to swing on the pivot bolt 75, thus preventing injury to the share. The rear end of the plow foot 73 carries rearwardly extending ears 77 which are arranged directly in rear of the pivot bolts 75 and these ears carry bolts 78, and if so desired the bolts 78 may be employed for connecting the plow foot and share to the standards. This will move the plows forwardly. The bolts 78 also form the pivot for the clamp 79 which is utilized for slidably connecting the ditch formers 80 with the shares. The plow shares 74 are held in position on the teeth 73 by means of removable bolts 81 which are extended through the feet 73. As shown the inner end of the bolt is extended through a suitable cross brace 82, which engages the rear standard of the plow beam. The ditch formers 80 are arranged directly in rear of the plows and are of a substantially rectangular configuration, and may be formed of any desired material. As shown, these formers include a wooden body 85, which is provided with a lower wear surface or shoe 86. The forward end of the shoe curves around the forward end of the wooden body 85 as at 87 and is spaced therefrom and forms a guide way for the U-shaped clamp 79. This permits a limited sliding movement of the ditch formers in relation to the plow shares and feet. It is to be also noted that when the plow strikes a hard object, such as a stone, that during the swinging movement of the plow share on the standard 66, the former 80 will also be raised, so as to permit the sliding movement thereof over the object. This prevents the stalling of the machine, and the breaking of the formers. If so desired, the upper surface of each of the formers 80 may have secured thereto in any preferred manner, a platform 88, upon which may be positioned a suitable weight, so as to hold the formers 80 in their ditches. These plates or platforms 88 also form means for moving the earth down and for packing the earth around the formers 80. This prevents the collapsing of the ditches. If so desired, men can stand on the platforms 88, so as to hold the formers and plows in the ditches, so as to insure the correct forming of the same. While I have shown the implement particularly adapted for forming ditches and have shown ditch making implements connected thereto, it is to be understood that the ditch making implements can be detached from the implement, and cultivators or ordinary plows attached thereto.

The implement is connected directly in rear of and arranged in close relation to the tractor, and conforms readily to the movement thereof, and permits the short turning of the implement, so as to permit the cultivating or the plowing of corners of fields, and the making of ditches and the like.

The plates 88 are connected to the plow standards 66 by means of rods 90. These rods 90 have interposed therein suitable adjusting means of a turn buckle construction. The upper ends of the rods are connected to the standards by means of collars 92, while the lower ends of the rods are connected to the plates 88 by means of bolts or the like 93.

From the foregoing description, it can be seen that a novel implement has been provided for making ditches, and a novel means for connecting the implement to a tractor.

Changes in details may be made without departing from the spirit or scope of this invention; but,

I claim:

1. The combination with a tractor and an agricultural implement, of means pivotally connecting the implement directly to the tractor, a transversely extending bar carried by the tractor, arms pivotally mounted upon the bar and slidably engaging the implement to prevent relative lateral movement thereof in relation to the tractor, and means for operatively connecting the tractor and implement together, for permitting swinging movement of the implement in relation to the tractor.

2. An agricultural implement comprising a pair of spaced parallel transversely extending body beams, forwardly extending attaching beams carried by the body beams, supporting blocks arranged between and adjustably carried by said body beams, earth working implements including standards, means for connecting the standards to the blocks, and means carried by said blocks for releasably engaging the standards to lock said blocks on the body beams against accidental displacement.

3. An agricultural implement comprising a pair of spaced parallel transversely extending body beams, forwardly extending attaching beams, ground engaging wheels carried by the body and attaching beams, earth working implements carried by the body beams, rigid attaching brackets, a rotatable shaft carried by the rigid attaching bracket, crank arms formed on the shaft, means connecting the crank arms with the body and attaching beams, and an operating crank arm formed on the shaft.

4. An agricultural implement comprising a transversely extending body, a plurality of blocks adjustable on said body each including a pair of sections, means for adjusting the sections toward and away from each other, earth working implements including standards, and means for receiving the standards between the sections of said blocks.

5. In an agricultural implement, a transversely extending body portion including a pair of spaced parallel beams, a plurality of notches formed on the upper surface of said beams, a plurality of blocks adjustably mounted on said beams, shafts rotatably carried by said blocks locking dogs formed on said shafts arranged to engage in said notches, handles for operating said shafts, and means to retain shafts against movement.

6. In a ditch making machine, a standard, a plow share pivotally secured to the standard, a frangible pin connecting the share to the standard above said pivot point, a substantially longitudinally extending rectangular ditch former secured to the plow share above the pivot point thereof, and a flat plate secured to the upper surface of the former.

7. In a ditch making machine, a standard, a plow share pivotally secured to the standard, a frangible pin connecting the share to the standard above said pivot point, a substantially longitudinally extending rectangular ditch former secured to the plow share above the pivot point thereof.

8. In a ditch making machine, a standard, a plow foot pivotally secured to the standard, a plow share rigidly secured to the foot, a frangible pin connecting the foot to the standard above the pivot point, a longitudinally extending substantially rectangular ditch former arranged in rear of the foot, means for slidably connecting the former with the foot, a plate arranged on the upper surface of the former, and adjustable means pivotally connecting the plate with the standard.

9. In a ditch making machine, a standard, a plow foot secured to the standard, a plow share rigidly secured to the foot, a rearwardly extending loop carried by the foot, a substantially rectangular shaped ditch former, and an eye carried by the forward end of the former and slidably mounted in said loop.

10. The combination with a tractor including a draw bar and a rear axle housing and frame, of an agricultural implement including a transversely extending body, forwardly extending attaching beams carried by the body, a cover secured to the draw bar, means for pivotally securing the forward end of the attaching standards to the clevis, the rearwardly extending attaching bars secured to the frame of the tractor, a shaft rotatably carried by the brackets and arranged above the attaching standards, crank arms carried by the terminals of the shaft, hoisting chains carried by the cranks and connected to the implement adjacent to the terminals of said body, a lever adjustably carried by the tractor, and means operatively connecting the lever with said shaft.

11. The combination with a tractor including a frame, an axle housing and a draw bar, of an agricultural implement including a body, forwardly extending attaching beams carried by the body, a clevis secured to the draw bar, means pivotally connecting the attaching beams to the clevis, a transversely extending beam carried by the clevis, forwardly extending arms secured to the bar for swinging movement, means slidably connecting the rear terminals of the arms to the attaching beams, rearwardly extending brackets secured to the frame of the tractor, a shaft rotatably mounted in said brackets and arranged above the body and attaching beams, rearwardly extending crank arms carried by the terminals of the shafts, a chain carried by the crank arms and having its terminals connected to the implements adjacent to the outer ends of the body, a ratchet quadrant carried by the axle housing, a lever pivotally connected to the quadrant, a crank arm formed on the shaft, and a connecting rod operatively connecting the last mentioned crank with the lever.

CHARLES W. ARMANTROUT.